Nov. 10, 1964     D. P. SMITH     3,156,007
POULTRY SHACKLE
Filed Dec. 21, 1961     2 Sheets-Sheet 1
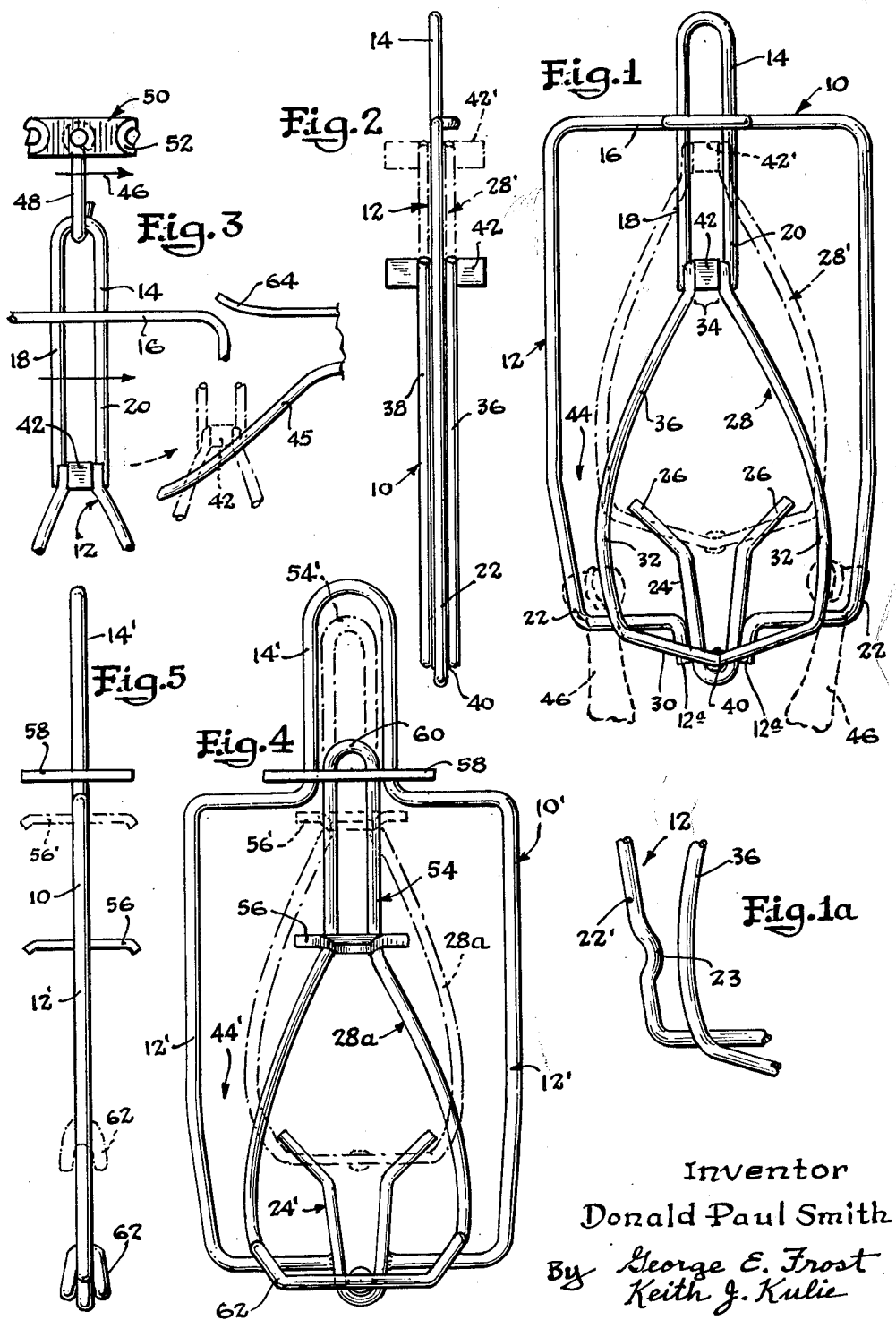
Inventor
Donald Paul Smith
By George E. Frost
Keith J. Kulie
Attorneys

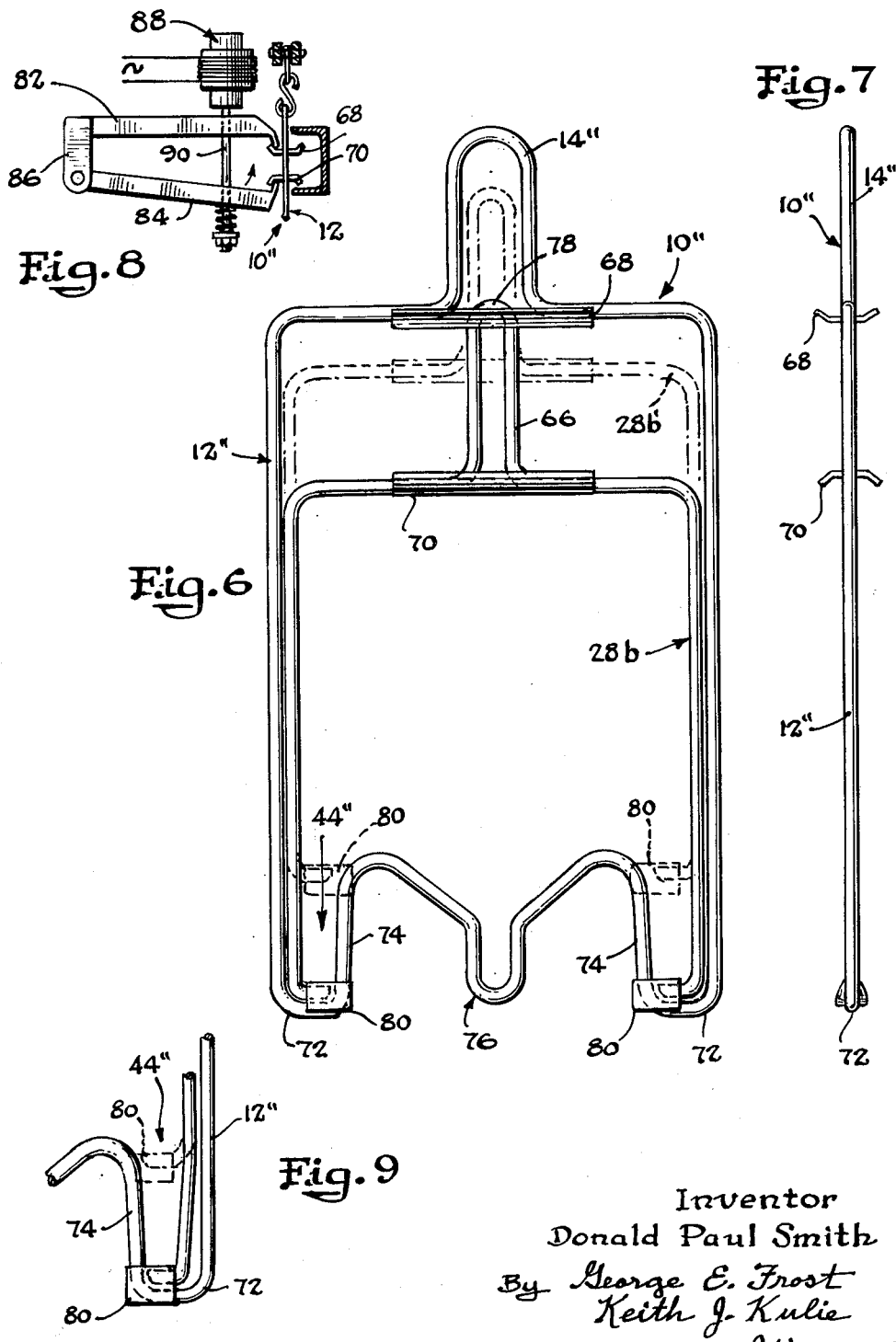

United States Patent Office 3,156,007
Patented Nov. 10, 1964

3,156,007
POULTRY SHACKLE
Donald P. Smith, 4530 Woodfin, Dallas 20, Tex.
Filed Dec. 21, 1961, Ser. No. 161,103
4 Claims. (Cl. 17—44.1)

The present invention relates to a shackle for supporting fowl or poultry, such as chickens and turkeys, on a moving overhead conveyor and more particularly it relates to an improved shackle adapted for automatically releasing a supported fowl at the proper point of conveyor travel.

Poultry or fowl shackles are employed in the processing of fowl to support the birds during the performance of the various processing operations such as killing, scalding, defeathering, eviscerating, inspecting, and the like. The fowl are suspended in spaced relation on the moving elevated conveyor and thus are conveyed between the stations where these successive operations are performed. At the end of the travel, the birds are removed from the shackles for washing, packaging, freezing, and similar steps.

The processing of fowl for the market, of economical necessity, is accomplished on a production line basis wherein the fowl are suspended from the shackles and carried by moving conveyor lines. Several of the steps in the processing of fowl require the birds to be placed in a substantially horizontal position while other steps direct that the bird be placed in a substantially vertical position. Thus, a shackle adapted to conveniently accommodate the various positioning requirements of the various processing operations can be employed more effectively than one not so constructed.

Most of the development work done on poultry shackles has been directed toward the development of satisfactory shackles for use in the defeathering operation. Very little work has been directed toward development of a shackle for evisceration or of a shackle that could be employed for both defeathering and evisceration.

It should be noted that in defeathering of poultry, the only requirement is that a means be provided to hold the bird by either the legs or the neck so that the picking fingers may pass over the remainder of the body of the bird to remove the feathers therefrom.

Shackles have been developed for holding the fowl by the legs and for releasing the fowl without requiring the manual lifting of the fowl. Such shackles normally are employed in the defeathering operation. These previous shackles, however are of a relatively complex nature or involve devices that are biased either toward the fowl retaining or fowl releasing position by some form of spring means. Some shackles are constructed of spring wire and adapted to be closed by moving one part of the fowl retaining means over a shoulder or the like on the frame of the shackle to provide an over-center hold. These prior art devices are not conducive to rapid, efficient, automatic processing of the fowl. For the most part they include complex mechanisms adapted to open or close the shackles or include spring biasing means. The shackles employing the complex mechanisms are generally unsatisfactory due to cost of installment and maintenance. The spring biased shackles are subject to deterioration in the service conditions experienced in the processing of fowl. For example, the shackles are continually exposed to an atmosphere of relatively high temperature water. Such humid, high temperature conditions impose severe service demands upon the shackles. These operating conditions will, for example, contribute greatly to severe corrosion of the shackle, particularly stress corrosion if the material is in a stressed condition such as shackles having spring biasing means.

After the fowl has passed through the entire processing operation, it is necessary to remove it from the shackle for subsequent steps, such as packaging or the like. Manual removal of the bird, of course, requires that the bird be lifted from the shackle by hand. In a continuous process such as is involved here this operation can become especially tedious, in view of the fact that some of the birds invoved in the processing may weigh from 20 to 30 pounds. It can readily be seen that manual removal of the birds is unsatisfactory. Generally, automatic removal of the birds, due to the severe service conditions imposed on the materials, is the most satisfactory and should be accomplished in the simplest manner feasible.

According to the preferred form of the present invention, a shackle including a frame member is provided with a vertically movable member. The movable member is adapted to grasp the legs of the fowl to thereby suspend the fowl within the shackle. Said movable member is vertically movable between two positions. In one position the movable member, in cooperation with the frame member, defines a leg engaging and retaining position and in a second or elevated position the movable member is adapted to release the legs and to allow the fowl to drop from the shackle. The shackle of the present form is preferably provided with a head or neck receiving groove to provide a means for positioning the bird in a substantially horizontal position for convenience in eviscerating or as required for inspection by the U.S.D.A. Inspection Service.

The preferred form of the shackle of the present invention is characterized by a construction having a rigid frame member with a movable retaining member disposed within and guided by said rigid frame member. The movable retaining member in fowl retaining position defines a pair of rigid, laterally spaced leg retaining slots in combination with the frame member.

It is, accordingly, a general object of the present invention to provide an improved shackle wherein automatic releasing of the fowl is accomplished without manually lifting the fowl from the shackle.

A further object of the present invention is to provide an improved shackle that is capable of suspending the fowl in the various positions required for the complete processing operation.

Another object of the present invention is to provide an improved shackle for poultry having leg and neck retaining portions and adapted to position the bird within the shackle such that the dorsal is tipped slightly upwards for inspection of the bird.

An additional object of the present invention resides in the provision of an improved shackle for fowl in which the fowl may be conveniently and rapidly attached merely by inserting the legs thereof in a leg receiving nip or slot.

A further object of the present invention is to provide an improved shackle for poultry having leg and neck retaining means and adapted to position the bird in substantially horizontal position for convenience in evisceration of the bird.

Still a further object of the present invention is to provide an improved poultry shackle having means to automatically discharge the poultry from the shackle which means are not dependent upon spring biasing of the shackle itself.

Still another object of the present invention is to provide an improved poultry shackle for fowl having fowl retaining means of rigid construction slidably mounted upon the frame member of the shackle and wherein the retaining means in one position cooperates with the frame of the shackle to provide fowl retaining means and in another position serves to release the fowl from the shackle.

Another object of the present invention is to provide an improved shackle for poultry having vertically movable poultry retaining means mounted within a rigid frame member adapted so that the retaining means moves upwardly in uniformly spaced, symmetrical relation to the frame member so that release of the poultry may occur from either side of the retaining means.

An additional object of the present invention is to provide an improved poultry shackle of rigid construction having vertically movable fowl retaining means mounted within the area defined by the sides of the frame member and having a trip member associated with the retaining means and adapted to be engaged by a suitable tripping mechanism to thereby move the retaining means vertically along the frame member and thus serve to position said reaining means in either fowl retaining or fowl releasing position.

A further object of the present invention resides in the provision of an improved shackle for fowl, the frame members of the shackle providing suitable guiding surfaces for a movable fowl retaining member to thereby guide the movable retaining member from one position wherein it engages the fowl to suspend the fowl from the shackle to another position wherein it releases the fowl.

Still an additional object of the present invention is to provide a new and improved poultry shackle of rigid construction having vertically movable fowl retaining and releasing means, that is rapidly and easily cleaned of foreign material.

The novel features which I believe to be characteristic of my invention are set forth with particularity in the appended claims. My invention itself, however, together with further objects and advantages thereof, will best be understood by reference to the following description taken in connection with the accompanying drawings, in which:

FIGURE 1 is an elevational view of one form of the shackle of the present invention schematically illustrating the engagement of the thighs of a fowl in the retaining groove, and illustrating by dashed lines the fowl releasing position of the vertically movable member;

FIGURE 1a is a fragmentary view of one of the leg retaining slots defined by the frame and the movable member wherein a projection is shown on the frame member to provide positive retention for the narrow, ankle portion of a fowl's leg.

FIGURE 2 is a side elevational view of the shackle of FIGURE 1 again illustrating by dashed lines the releasing position of the movable member;

FIGURE 3 is a fragmentary view of the shackle of FIGURES 1 and 2 illustrating one type of tripping mechanism that might be employed in cooperation with the trip member of the movable member of the present invention;

FIGURE 4 is an elevational view of a modification of the shackle of the present invention;

FIGURE 5 is a side elevation of the shackle as shown in FIGURE 4;

FIGURE 6 is an elevation of still another modification embodying the principles of the present invention;

FIGURE 7 is a side elevation of the shackle illustrated in FIGURE 6;

FIGURE 8 is a fragmentary view to a reduced scale of the shackle of FIGURES 6 and 7 illustrating another type of tripping mechanism adaptable to raise the movable member to fowl releasing position; and FIGURE 9 is a fragmentary view of a modification of the shackle illustrated in FIGURES 6 and 7 showing a leg retaining groove with an increased leg pinching effect for greater leg retaining pressure.

Referring now more particularly to FIGURES 1 and 2, there is shown a shackle for suspending fowl, indicated generally at 10. The shackle is comprised of a frame member 12, substantially quadrilateral in outline although it should be understood that the configuration of the outline may be varied in certain respects without altering the characteristics of the shackle.

A shackle support or suspension member 14 is rigidly attached to the shackle 10 at the top side 16 thereof.

The suspension member 14 for convenience is formed in the shape of an inverted U and preferably welded at the top bar 16 of the frame 12. The inverted U-shaped suspension member 14 defines a pair of guide members 18 and 20 which guide members extend below the top bar 16 of the frame 12 for a distance. It should be noted that other modifications of construction of the suspension means may be obvious and that the forms shown herein are merely included for purposes of illustration. The bottom portion 22 of each of the sides of the frame 12 is tapered inwardly toward the central portion of the shackle 10. A V-shaped bar 24 is welded to the bottom of the frame 12 of the shackle 10. As shown in FIGURE 1, the portion 12a of the bottom bar of the frame 12 is bent downwardly adjacent the interruption in the frame. This provides additional area to which the V-shaped member may be attached by welding to provide a strong, rigid, unitized frame member. As shown, the V-shaped bar is flared generally outwardly adjacent the upper terminal portions thereof, as indicated at 26. The flared portion, as at 26, permits the head or neck of the fowl to be conveniently and readily introduced therein without requiring undue attention to the problem. In production line processes, such as are involved in the processing of fowl, it is essential that each operation or characteristic thereof be adapted for quick, accurate performance.

A fowl retaining member, indicated generally at 28, is slidably positioned upon the supporting and guiding surfaces of the frame 12. The retaining member 28 is defined by a shallow V-shaped portion 30 at the bottom thereof, the V-shaped bottom extending continuously upwardly into slightly bulging portions 32 and thence tapering gradually inwardly to spaced relation at the upper terminal thereof, as shown at 34 in FIGURE 1. The retaining member 28 is formed of a pair of bars 36 and 38, FIGURE 2, shaped as described above and as shown in FIGURE 1. The bars 36 and 38 are disposed one on either side of the frame 12 and are integrally joined at the lower extremity thereof by a lug 40 which is preferably welded to each of the bars 36 and 38.

A trip member or bar 42 is inserted into the space 34 between the upper terminals of the bars 36 and 38. The bar 42 is preferably welded to each of the bars 36 and 38 thus joining the separate bars at the top as well as at the bottom and caging the fowl retaining member 28 upon the frame 12. As shown more clearly in FIGURE 2, the bar 42 protrudes from either side of the shackle 10 a short distance. The protruding portions of the bar 42 are adapted to be engaged by suitable tripping devices which are adapted to lift the bar 42 to the position shown by the dashed lines in FIGURES 1 and 2. It can readily be seen that as the bar 42 is lifted by the tripping mechanism it will be guided upwardly by the guide bars 18 and 20. It is important to keep the fowl retaining member 28 substantially centered within the frame 12. If it is not centered, the fowl may be released too early, it may not be engaged at all by the retaining member, or the member 28 may engage only one leg of the fowl, depending, of course, upon the degree of displacement of the retaining member 28 from the general central area defined by the frame 12. It is obvious that if the member 28 were displaced so that the bulging portion 32 was in contact with one side of the frame 12, then the leg of the fowl would not enter that side—at least without forcing—nor would the opposite leg be retained within the now exaggerated opening on the other side of the shackle. If the member 28 were to be lifted in a fashion that would displace it from its substantially central position, then the member 28 may pinch one leg while releasing the other. The pinched leg may prevent the shackle from being lifted further, or if the lifting force of the tripping mechanism is substantial, the leg may be torn from the body of the fowl and thus fail to pass the subsequent inspection. The bar 42 thus serves to keep the retaining member 28 substantially centrally disposed within the area defined by the frame 12 so that the legs of the fowl are evenly grasped and so that both legs of the fowl are released evenly without pinching during the releasing operation.

The fowl retaining member 28 is further restrained and guided at the bottom portion thereof by the sliding action of the bottom members of the movable member 28 upon the V-shaped bar 24 and the bottom bar of the frame 12 of the shackle 10. The guiding action inherent in this assembly restrains even limited rotation of the fowl retaining member 28 about the vertical axis and results in easy sliding vertical movement of the member.

The tapered portion 22 at the bottom of each of the side members of the frame 12 is included to provide a wedging action in cooperating with the fowl retaining member 28.

The legs of a fowl are retained within the shackle as schematically represented by the dashed lines in FIGURE 1. As shown, the legs 46 of the fowl are placed into the slot 44 of the shackle 10 at a position just above the knee joint in the legs. Positioning of the legs of the bird within the slot 44 by the knee joint is usually done for purposes of evisceration and inspection of the bird—it being noted, of course, that for both operations the neck of the bird will be placed within the V-shaped opening defined by the member 24 so that the bird will be supported in a substantially horizontal position within the shackle, the dorsal of the bird being elevated slightly from the horizontal.

The shackle of the present invention may also be employed for the picking operation. The leg slot 44 may be modified slightly if the shackle is to be utilized predominantly for defeathering. In the defeathering operation the bird is supported within the shackle by insertion of the portion of the leg just above the talons within the slots 44. The leg is prevented from coming out of the groove 44 by the talons, said talons being too large to pass through the area defining the groove or slot.

The modified slot shown in FIGURE 1a is especially adapted to retention of the "ankle" portion of the bird within the slot. As illustrated, the frame member 12 is provided along the tapering portion 22' thereof with a detent or integral projection 23. The projection 23 is adapted to prevent accidental release of the leg of the fowl from the retaining slot by upward movement thereof. The projection 23 provides a positive confinement for the narrow lower portion of the leg of a fowl, in combination with the sidewall 36 of the movable member 28.

Release of the fowl from the shackle 10 is realized by vertically raising the retaining member 28 along its guiding surfaces. It can readily be seen that as the member 28 is raised, the leg retaining slots or grooves 44 defined by the sides of the frame 12 and the lowered retaining member 28 are not defined with the member 28 in the raised position as shown by the dashed lines 28' of FIGURE 1. With the member 28 in the position defined at 28' the legs of the fowl will slip off of the lower bar of the frame 12, there being nothing to restrain the legs. The weight of the bird alone will be sufficient to release the bird from the shackle with the member 28 raised.

When the retaining member 28 is moved vertically upwardly to effect release of the fowl confined within the shackle, there is no abrasion of the legs of the fowl since the slot rapidly and continually widens during upward movement of said retaining member. As shown in FIGURE 1, the lower, laterally spaced portions of the retaining bars 36 and 38 (bar 38 shown in FIGURE 2) of the movable member 28 curve inwardly. When the member 28 is in the fully lowered, retaining position, it, in combination with the inwardly tapered portion of the frame member 12, define a substantially uniform slot portion 44 along a distance of the respective members. As soon as the member 28 begins to move upwardly, the inward curvature of the lower portion of said member, in combination with the outwardly tapering portion of the frame member 12 of the shackle 10—with respect to upward movement of the movable retaining member 28—present a rapidly widening slot 44 on each side of the member 28. With this construction there is no tendency for the bars 36 and 38 of the movable member to slide in abrasive fashion against the legs of the bird and thus there is no tendency for the bars 36 and 38 to tear the skin of the legs.

It should be observed that with the construction of the present invention, the movable member effects a removal of the retaining slot rather than lifting the bird out of the slot. As can readily be seen, when the movable member 28 is lifted to an elevated position the bird will not be "lifted" out of the shackle but will simply drop therefrom when the retaining slots have been removed. As the movable member moves upwardly defining a continuously increasing slot 44, one of the legs of the fowl will drop from the shackle retaining position. As soon as one leg of the fowl drops away from the shackle, the movable member 28 is free to move laterally into the space vacated by the leg that has dropped away to quickly release the other leg from the opposite slot. Thus, both legs of the bird are released substantially simultaneously. Lateral movement of the movable member 28 can occur once the member has moved upwardly to the extent that the bar 40 is free of the lower narrow portion of the V-shaped member 24. It should be understood, of course, that the total lateral movement of the movable member 28 is dependent upon the vertical position thereof in that the bar 42 is still confined within the upwardly diverging V-shaped guiding member.

The weight of the bird will tend to hold the shackle down and prevent it from coming off of the conveyor suspension portion when the movable member 28 is urged upwardly to release the bird. However, shackle holding means may be provided to prevent upward movement of the shackle, as a precautionary feature, such means being described below.

If the bird is suspended in the horizontal position prior to release thereof, the neck will be restrained by the V-shaped member 24. The neck of the bird being restrained by this member will not automatically discharge as will the legs. It is, therefore, necessary to provide means to lift the neck of the fowl from the member 24 in order to release the bird from the shackle. This lifting action is accomplished by the shallow V-shaped portion 30 of the fowl retaining member 28. When the member 28 is lifted to effect a release of the bird, the portion 30 will engage the neck of the bird to thereby lift the same out of the groove defined by the member 24. Once the neck of the bird is lifted upwardly within the member 24 to a point where the head can pass through, the weight of the bird will be sufficient to permit the bird to drop from the shackle. It is apparent that the center of gravity of the bird is at all times below the lowermost portion of the shackle and the bird will drop from the shackle of its own accord, unless it is restrained in the fashion hereinabove described. It will be noted that the shallow V-shaped portion 30 of the member 28 extends into the flaring portion 26 of the V-shaped member 28 when the member is in the uppermost position defined in FIGURE 1 at 28'.

Thus, it can readily be appreciated that the form of shackle of FIGURE 1 of the present invention is a rigid unit that is economical to manufacture. Since the shackle is not spring biased toward the fowl retaining or releasing position, there is no spring action to deteriorate over a period of use of said shackle. An additional feature, of course, resides in the simplicity of construction and operation of the automatic releasing feature of the shackle. It can readily be seen that by guiding the movable member 28 at spaced points at the lower portion thereof, rotation of the member 28 is prevented with respect to the frame member 12 of the shackle 10. Another benefit of the lower spaced guiding portions of the shackle resides in the fact that the central portion of the shackle is open and adapted for inclusion of the neck retaining portion 24 for positioning of the bird in the substantially horizontal position for evisceration and inspection.

The structure as shown in FIGURE 3 may be employed to elevate or raise the movable member 28 to the fowl releasing position. As illustrated, a suitably shaped camming bar or surface 45 is provided at the point in the conveyor travel where the fowl is to be discharged from the shackle. The shackle 10 is suspended by a suitable conformation, such as the suspension member 14 of said shackle, on the conformation receiving portion 48 of the conveyor, indicated generally at 50. The portion 48 may be in the form of a hook or the like over which the suspension member 14 may be dropped. The member 48 is operatively associated with a continuously moving conveyor chain 52 and is adapted to be carried thereby along its length of travel. With the conveyor assembly 50 moving in the direction indicated by the arrow 46, the bar 42 of the shackle 10 will move along the camming surface 45 to thereby raise the movable member 28 to a position shown by the dashed lines 42'. Raising of the movable member 28, of course, serves to release the fowl from the restraining influence of the shackle and to deposit said fowl in the predetermined position of conveyor travel. Other equally suitable means of raising the movable member 28 to the elevated position may be employed without interfering with the operational characteristics of the automatic release feature of the shackle of the present invention.

One modification of the shackle of the present invention is illustrated in FIGURES 4 and 5. The shackle 10' of this modification has a frame member 12' with which is operatively associated a movable member 28a. The suspension portion 14' of the frame member 12' is formed continuously with the frame member 12' and is adapted to receive the member 48 of the conveyor 50, illustrated in FIGURE 3. The bottom portion of the frame 12' is interrupted and a V-shaped member 24' is inserted between the two ends of the interrupted portion of said bottom.

The movable member 28a of the shackle 10' is provided with a continuously formed inverted U-shaped portion 54. A lift or trip member 56 is rigidly affixed to the movable member 28a at the lower portion of the U-shaped portion 54, as illustrated in FIGURES 4 and 5. A guide member 58 is affixed to the suspension portion 14' of the frame member 12'. The guide member 58 is preferably vertically positioned on the suspension member 14' such that the upper terminal portion 60 of the U-shaped portion 54 remains guidably positioned thereby with the movable member at the lowered position, indicated by the solid lines in FIGURE 4. The lift member 56 is positioned on the movable member 28a such that when the movable member 28a is in the fully elevated position 28a' said lift member 56 will be abutting the lower surface of the top portion of the frame member 12'. It can readily be seen that in the lowered position of the movable member 28a, the elevated position as illustrated at 28a', and all positions in between, the guide member 58 is in straddling relation to the U-shaped portion 54 to guidingly receive said portion 54 during the full extent of its vertical travel.

The bottom portion of the movable member includes a saddle-like member 62. The saddle 62 is preferably welded to the adjacent bar portions of the movable member 28a to define a completed, rigid, continuous structure. The saddle member 62 is adapted to rest upon the bottom portion of the frame member 12' when the movable member 28a is in its normally free, lowered position, indicated by the solid lines of FIGURE 4. The saddle-like member 62 further is in straddling relation to the bottom bar of the frame 12' and the vertical guiding surfaces of the V-shaped member 24'. As indicated by the dashed lines in FIGURE 4, identified by numeral 28a', the saddle portion 62 of the movable member 28a is in guided engagement with the vertical guiding surfaces of the V-shaped member 24' in the fully elevated position of said member 28a as well as in the lowered position and all positions in between. Thus, the member 58 and the saddle member 62 are in mutual straddling relation to their respective vertical guided and guiding surfaces.

It should be observed that the straddling relation of one member to the other—whether it be the frame or some piece appurtenant thereto or whether it be the movable member—is the only feature of significance for the guiding relationship of the movable member with respect to the frame member.

The trip or lift member 56 is adapted to be engaged by a suitable lifting mechanism (such as the camming surface illustrated in FIGURE 3) to raise the movable member 28a to the elevated or fowl releasing position. In addition, the guide member 58 is adapted to be engaged by the upper rail 64 of the camming device illustrated in FIGURE 3 to serve as a hold down device for the shackle to thereby prevent the entire shackle from being lifted by the lifting mechanism in the process of lifting the movable member. This hold down feature may be significant when the bird is pinched within the grooves or nips 44 (FIGURE 1) or 44' (FIGURE 4) since lifting of the movable member tends to impart a general lifting motion to the entire shackle. In such event, the entire shackle could be lifted from the conveyor hook 48, unless a restraining device (not shown) were placed across the open area of the hook to completely close the same and lock the shackle therein.

Another modification of the shackle of the present invention is illustrated in FIGURES 6 and 7 of the drawings. The shackle 10" includes a frame 12". The frame 12" is formed continuously to define a suspension portion or conformation 14", a pair of loops 72 at the bottom portion of said shackle 10", vertical guide surfaces 74 spaced from the sides of said frame member 12" and a head or neck holding portion, indicated generally at 76. A movable member 28b is vertically movably disposed with respect to the frame member 12" of the shackle 10". The movable member 28b is comprised of an upper vertical guided member 66 which is formed, in this illustrative embodiment, continuously with the side members of the movable member 28b. The guided member 66 of the movable member 28b is guidingly received within a guide member 68. The guide member 68 is affixed to the frame member 12" of the shackle 10" in a position such that the upper terminal 78 of the guided member 66 is guidingly received within the member 68 in all vertical positions of the movable member 28b. A lift or trip member 70 is affixed to the movable member 28b and is adapted to be received by a suitable trip mechanism which mechanism is adapted to apply the external force required to raise the movable member 28b from its rest or free position, shown by the solid lines in FIGURE 6 to the elevated position indicated by the dashed lines 28b'. The side portions of the movable member 28b extend downwardly and terminate in an abbreviated inward bend to which is attached a saddle-like member 80. The saddle member 80 is guidingly received on the vertical guiding surfaces defined by the bar portions 74. The portions 74 of the frame member 12" extend vertically a distance required to guidingly support the saddle members 80 for the full extent of vertical travel of the movable member 28b. In this embodiment of the invention, the guide member 68 and the saddle-like member 80 are in straddling relation to their resective vertical guiding surfaces throughout the full extent of vertical travel of the movable member 28b.

In operation the shackle 10" of FIGURES 6 and 7 serves to suspend the fowl by nipping the legs of the fowl within the grooves or nips 44". As described above, the small part of the leg of the fowl is dropped into the nip 44" and is prevented from passing therethrough due to the fact that the wide terminal portion of the leg of the fowl will not pass through the nip 44" defined by the vertical guiding portions 74 and the mating sides of the movable member 28b. The neck of the fowl may be inserted into the neck-receiving groove 76 if the fowl is to be horizontally positioned for evisceration or inspection.

The movable member 28b may be raised vertically by a tripping mechanism such as that shown generally in FIGURE 8. The tripping mechanism of FIGURE 8 is comprised of a stationary member 82 and a movable member 84. The member 84 is pivotally fastened to a suitable support member 86 which support may be rigidly affixed to the stationary member 82 of the tripping mechanism. A solenoid, indicated generally at 88, is operatively associated with the movable member 84 to move the same with respect to the stationary member 82. The armature 90 of the solenoid 88 is attached at its free end to the movable member 84. Thus, when the solenoid is energized, for example, the armature is drawn to a position within the winding thereof. This action moves the armature vertically upwardly as shown in FIGURE 8 and, due to the attachment of the free end of the armature 90 to the movable member 84, moves the member 84 upwardly towards the stationary member 82. If the solenoid is energized with the shackle in the proper position, the lower jaw or movable member 84 of the tripping mechanism will engage the lift member 70 of the movable member 28b and thus lift the movable member to its elevated position 28b. As the movable member is lifted to the elevated position, it can readily be seen that the inwardly bent portion of the lower side portions of said member 28b along with the saddle-like portion 80 will tend to lift the leg of the fowl out of nipping relation with the shackle, finally lifting the leg to an unrestrained position whereupon the fowl drops from the shackle under the effect of its own weight. The stationary member 82 of the tripping mechanism engages the upper guide member 68 during the lifting operation and thus serves to hold the shackle 10" down and prevent the entire shackle from being lifted from the conveyor hook.

As illustrated in FIGURE 9, the lower portion of the sides of the movable member 28b may be biased slightly inwardly to assure intimate guiding contact of the saddle-like member 80 with the vertical guiding member 74 and to assure that the leg of the fowl is tightly confined within the nip generally defined at 44" of FIGURES 6 and 9.

While I have shown and described a specific embodiment of the present invention it will, of course, be understood that other modifications and alternative constructions may be used without departing from the true spirit and scope of this invention. I therefore intend by the appended claims to cover all such modifications and alternative constructions as fall within their true spirit and scope.

What I claim as new and desire to secure by Letters Patent of the United States is:

1. An improved automatic release shackle for fowl adapted to be pendulously suspended on a traveling conveyor and effective to release the fowl from the shackle at a predetermined point of conveyor travel comprising:

a substantially quadrilateral frame member having sides and having conformations adapted to be received on the conveyor to suspend the shackle pendulously therefrom an oppositely disposed fowl head receiving means, said fowl head receiving means being in the form of a substantially V-shaped portion adapted to retain the head of the fowl therein;

a pair of spaced guide bars depending from the top portion of the frame member;

a movable member supported by said frame member for vertical movement therealong from a first position wherein the movable member and frame member cooperatively define fowl holding nips between the sides of the frame and the movable member serving to retain the fowl within the shackle to a second position effective to define fowl-passing spaces to release the fowl from the shackle, said member including a pair of spaced bars integrally interconnected at their respective top and bottom portions thereof to form a unitary movable member, said spaced bars being disposed on either side of the frame member, the top portion of said movable member being guidingly received within the spaced guide bars, the bottom portion of said movable member being guidingly received along the adjacent surfaces of the fowl head receiving means, said movable member having a central guide member extending between the spaced bars and guidingly received within the head receiving means of the frame; and a lift member rigidly attached to said movable member and adapted to vertically urge said movable member to said second position upon application of an external force thereto.

2. An improved automatic shackle assembly for fowl adapted to be suspended on a traveling conveyor and effective to release the fowl from the shackle assembly at a predetermined point of conveyor travel, said shackle assembly comprising:

a substantially quadrilateral frame member having a top, bottom and sides with a suspension member adapted to be received on the conveyor to suspend the shackle assembly pendulously therefrom, said frame member defining fowl head receiving means integral with the bottom of said frame member and positioned thereon opposite said suspension member, said head receiving means being in the form of a substantially V-shaped portion extending toward the frame top from the frame bottom and extending outwardly toward the frame sides, the V-shaped member being narrowest in the portion thereof adjacent the frame bottom, the head holding means terminating in ends spaced from the side walls of the frame; and a fowl retaining member supported by said frame member for movement parallel to the plane extending between the sides of the frame member, said retaining member adapted in one position to grip the fowl in combination with the frame and to hold it in the shackle assembly and alternately adapted to be moved away from gripping engagement with the fowl whereby the fowl is permitted to drop away from the shackle assembly, said fowl retaining member defining sides which extend to the greatest lateral dimension in respective spaced fowl retaining relation to the sides of the frame member adjacent the bottom of said frame when the retaining member is in said one position, said retaining member having central guide means integral therewith and extending into the head receiving means of the frame, the guide means orienting the sides of the retaining means in respective spaced relation to the frame sides during travel of the retaining means with respect to the frame whereby fowl retaining means of substantially uniform lateral dimension are defined between the frame and the retaining member side walls.

3. An improved automatic release shackle assembly for fowl adapted to be suspended on a traveling conveyor and effective to release the fowl from the shackle assembly at a predetermined point of conveyor travel, said schackle assembly comprising:

a substantially quadrilateral frame member having a top, bottom and sides with a suspension member adapted to be received on the conveyor to suspend the shackle assembly pendulously therefrom, said frame member defining fowl head receiving means integral with the bottom of said frame member and positioned thereon opposite said suspension member, said head receiving means being in the form of a substantially V-shaped portion extending toward the frame top from the frame bottom and outwardly toward the frame sides, the V-shaped portion being narrowest in the portion thereof adjacent the frame bottom, the head holding means terminating in ends spaced from the side walls of the frame; and a fowl retaining member supported by said frame member for movement parallel to the plane extending between the sides of the frame member, said retaining member adapted in one position to grip the fowl in combination with the frame and to hold it in the shackle assembly and alternately adapted to be moved upwardly from the frame bottom to release the fowl from the shackle, said retaining member including a pair of spaced members disposed on either side of the frame, each of said spaced fowl retaining members defining sides which extend to the greatest lateral dimension in respective spaced fowl retaining relation to the sides of the frame member adjacent the bottom of said frame when the retaining member is in said one position, said retaining member having central guide means between the spaced members and integral therewith and extending into the head receiving means of the frame, said guide means orienting the sides of the spaced retaining means in respective spaced relation to the frame sides during travel of the retaining means with respect to the frame whereby fowl retaining nips of substantially uniform lateral dimension are defined between the frame and the spaced pair of retaining members.

4. An improved automatic release shackle assembly for fowl adapted to be suspended on a traveling conveyor and effective to release the fowl from the shackle assembly at a predetermined point of conveyor travel, said shackle assembly comprising: a substantially quadrilateral frame member having a top, bottom and sides with a suspension member adapted to be received on the conveyor to suspend the shackle assembly pendulously therefrom, said frame member defining fowl head receiving means integral with the bottom of said frame member and positioned thereon opposite side suspension member, said head receiving means being in the form of a substantially V-shaped portion extending toward the frame top from the frame bottom and extending outwardly toward the frame sides, the V-shaped member being narrowest in the portion thereof adjacent the frame bottom, the head holding means terminating in ends spaced from the side walls of the frame; and a fowl retaining member supported by said frame member for movement parallel to the plane extending between the sides of the frame member, said retaining member adapted in one position to grip the fowl in combination with the frame and to hold it in the shackle assembly and alternately adapted to be moved away from gripping engagement with the fowl whereby the fowl is permitted to drop away from the shackle assembly, said fowl retaining member defining sides which extend to the greatest lateral dimension in respective spaced fowl retaining relation to the sides of the frame member adjacent the bottom of said frame when the retaining member is in said one position, said retaining member having guide means integral therewith and slidably engaging the head receiving means of the frame, the guide means orienting the sides of the retaining means in respective spaced relation to the frame sides during travel of the retaining means with respect to the frame whereby fowl retaining means of substantially uniform lateral dimension are defined between the frame and the retaining member side walls.

References Cited by the Examiner

UNITED STATES PATENTS 3,044,109  7/62  Wayne _____ 17—44.1

FOREIGN PATENTS 136,525  5/60  USSR.

SAMUEL KOREN, *Primary Examiner.*

LUCIE H. LAUDENSLAGER, *Examiner.*